United States Patent [19]

Schaefer et al.

[11] Patent Number: 4,704,777
[45] Date of Patent: Nov. 10, 1987

[54] CREEPER INSTALLATION METHOD AND APPARATUS

[75] Inventors: David V. Schaefer, Burlington; Richard J. Honeyager, Oshkosh, both of Wis.

[73] Assignee: J. I. Case Company, Racine, Wis.

[21] Appl. No.: 863,779

[22] Filed: May 16, 1986

[51] Int. Cl.$^4$ .................. B21H 7/00; B21K 19/00
[52] U.S. Cl. .................. 29/148.3; 29/401.1; 74/606 R
[58] Field of Search ............. 29/148.3, 401.1, 402.08; 74/606 R, 356, 357, 359

[56] References Cited

U.S. PATENT DOCUMENTS 2,956,451  10/1960  Bowman ............... 74/606 R X
4,359,145  11/1982  Huff ..................... 74/606 R X Primary Examiner—Carl E. Hall
Attorney, Agent, or Firm—Peter N. Jansson, Ltd.

[57] ABSTRACT

A method and apparatus for ready replacement of a noncreeper subassembly in a tractor transmission with a creeper subassembly. The method includes subassembly removal and replacement through a window. Removal is by opening the window, reaching in to move, along a subassembly main shaft, a collar which joins the main shaft to a shuttle shaft and in so doing opening a void between the shafts, and then using the void to advantage to manipulate the subassembly out the window. Replacement reverses the same steps. The collar on the creeper subassembly has means for seating a bearing.

6 Claims, 9 Drawing Figures

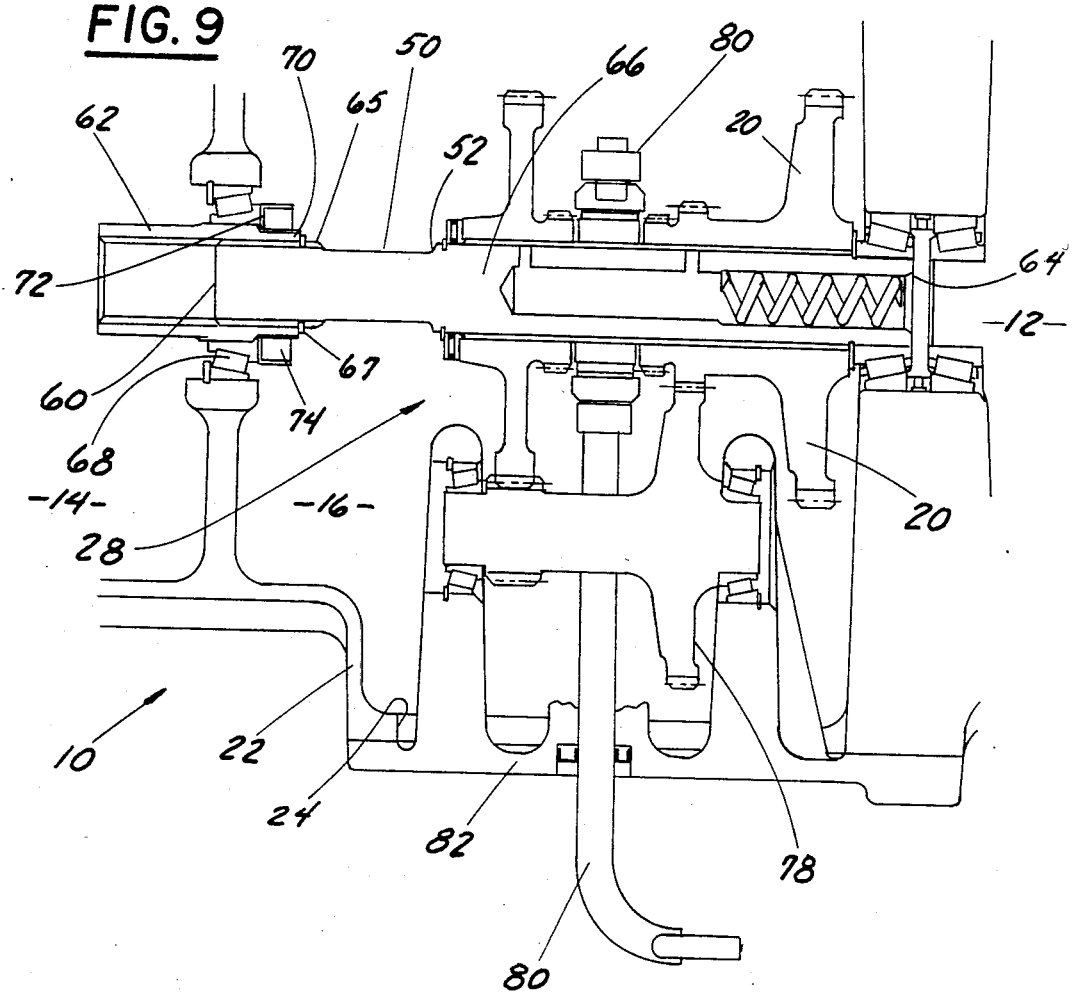

CREEPER INSTALLATION METHOD AND APPARATUS

FIELD OF THE INVENTION

This invention is related generally to transmissions for tractors and the like and, more specifically, to methods and apparatus for replacement of major transmission subassemblies. Still more specifically, the invention relates to installation of a creeper gear subassembly in place of a noncreeper subassembly.

BACKGROUND OF THE INVENTION

Transmissions are by their very nature very complex apparatus. Replacement of major transmission subassemblies for as part of repair operations or for the purpose of achieving different operational qualities is a difficult and time-consuming task. Major changes in a transmission for the latter purpose are rarely undertaken.

Creepers are helpful in certain very slow operations extending over a protracted period of time, such as the planting of seedlings. If a creeper is needed, it would usually have been an included option at the time the tractor is purchased. But tractors usually do not need to be equipped with creeper drives and do not include them.

There are occasions when a farmer who did not anticipate the need for a creeper will need to utilize his tractor for something requiring a very slow drive speed and wish his tractor had been equipped with a creeper. To make a change in the transmission is at best very difficult, time-consuming and expensive. Rather than undergoing expensive transmission rebuilding procedures or acquiring a new tractor or, it would be very desirable to have a simple method for the purpose of revising a tractor transmission to include a creeper.

BRIEF SUMMARY OF THE INVENTION

This invention is a simple method and apparatus for replacing a noncreeper subassembly with a creeper subassembly in a tractor transmission. The method of this invention is simple enough that it may readily be carried out without substantial disassembly of the transmission and without the need for major factory-type equipment. A mechanic, such as a mechanic employed by a tractor dealership, can quickly and easily handle the job.

In order to carry out the method of this invention, the transmission which is being modified must include the apparatus of the invention. The method and apparatus of this invention will be described together.

The subassembly which must be replaced is in an option section of the transmission, between the speed section and the range section. To facilitate the method of this invention, the transmission case has a covered window at its option section, adjacent to the factory-installed noncreeper subassembly which is to be replaced by a creeper subassembly.

The replaced subassembly and the replacing subassembly each have the same axial dimension, and each have a first end and an opposite second end. Each of these subassemblies is joinable at its first end by a main shaft to a transmission shuttle shaft which is in the range section of the transmission by splined engagement of the distal ends of such shuttle shaft and main shaft in the opposite ends of a collar which is in an internal orifice in the transmission case. More specifically, a bearing cone which is supported on the outside of the collar is seated in a bearing cup on the transmission case orifice.

As will appear, the apparatus of this invention relates to, among other things, the relationship of the distal ends of the main shaft and shuttle shaft, the relationship of the collar to the main shaft, and the nature of the collar on the main shaft of the creeper subassembly.

The sequential steps of the method of this invention are as follows:

To gain access to the inside of the option section of the transmission, the transmission window is opened by removing the cover. This may be readily carried out by removing whatever fastening means was used to seal the cover over the window.

To facilitate the method of this invention, the collars on the splined distal ends of the main shafts of the the factory-installed noncreeper subassembly and the creeper subassembly are held at the right positions on such splined distal ends by stop means on the main shafts. Such stop means are movable along their respective main shafts after they have been released from their positions on the main shafts. Snap rings are held in place by butt means on their main shaft and their own spring pressure.

In order to begin the removal of the noncreeper subassembly, a mechanic reaches through the window, releases the stop means, and moves it along the main shaft in a direction away from the shuttle shaft, that is, into further insertion along the main shaft. When the stop means is a snap ring, it may be readily spread by reaching through the window and using a common snap-ring spreading tool.

By moving the snap ring along the main shaft in a direction away from the shuttle shaft, the collar is made free to do so as well. This is made possible because the end of the noncreeper main shaft is splined a sufficient distance from its distal end to accommodate such collar movement.

Just as important is the positioning and dimensioning of the main shaft with respect to the shuttle shaft. The distal ends of the main shaft and the shuttle shaft are spaced apart when fully installed such that the movement of collar further onto the main shaft and away from the shuttle shaft, as described above, creates a void between such distal ends.

The noncreeper subassembly may then be moved into the void, toward the shuttle shaft. This allows the opposite or second end of the subassembly to become unseated. This in turn allows a mechanic to manipulate the noncreeper subassembly in various directions and into various orientations to remove it from the transmission through the window. The dimensions of the window are sufficient for this purpose.

When the factory-installed noncreeper subassembly has been removed, the replacement creeper subassembly is inserted through the window into the transmission case and manipulated into position in generally the reverse manner, taking full advantage of the void space previously mentioned.

This is done by first moving the first end of the creeper subassembly, more specifically, its main shaft distal end, into the void and toward the shuttle shaft as much as possible, so that the opposite or second end of the creeper subassembly can be brought into proper alignment with the position where it is to be seated. This is possible because the creeper subassembly has a main shaft similar to the main shaft of the noncreeper subassembly, accommodating movement of a collar (sometimes referred to as the creeper collar) therealong near its distal end; and when the creeper subassembly is first inserted the creeper collar is in full engagement with the creeper main shaft.

After the second end of the creeper subassembly is seated, the creeper collar is moved toward the shuttle shaft and engaged with it in generally the same manner in which the noncreeper collar was engaged with it. When the creeper collar is in the right position, a snap ring or other stop means on the creeper main shaft is moved into a position near the distal end of the main shaft to prevent the creeper collar from sliding further onto the main shaft. This snap ring is like the snap ring previously described and the creeper shaft has butt means to hold the snap ring in place.

The creeper collar, which supports a bearing cone, has an axially-adjustable means on it for securing the bearing cone in seated position against the bearing cup. In a preferred form, the creeper collar has a threaded portion adjacent to the bearing cone thereon and a lock washer and lock nut are on the threaded portion to move the bearing cone into its proper seating with the bearing cup.

The lock washer is keyed on its inner diameter to the creeper collar, by means of a slot therein, and, when the bearing has been properly seated by turning the nut along the threaded portion of the creeper collar, a keying means on the outer diameter of the lock washer is bent into engagement with a slot on the lock nut. In this manner, accidental removal or loosening of the structure is avoided.

After the creeper subassembly is fully in place and engaged as previously described, a lay-shaft assembly and shift apparatus, which are secured to the inside surface of a window cover, are inserted into the transmission case and engaged in their proper position. Then, the window is closed by securing such window cover to the transmission case by the use of bolts or other fastening devices.

The method steps of this invention may be carried out quickly and easily and do not require unusual tools or equipment.

The apparatus of this invention, as already described, includes a windowed transmission, a dimensioning of the main shaft such that a void space is defined between the distal ends of the shuttle shaft and main shaft, a splined section of sufficient axial dimension near the distal end of the main shaft such that the collar may be fully received onto the distal end to create the aforementioned void space, and the creeper collar characteristics previously described.

OBJECTS OF THE INVENTION

It is the principal object of this invention to provide an easy method for replacement of one major gear subassembly with another gear subassembly.

Another object of this invention is to provide a method for easy replacement of a noncreeper gear assembly with a creeper gear assembly.

Another object of this invention is to provide an improved method and apparatus for making major revisions in a tractor transmission to include a creeper drive.

These and other objects of the invention will be apparent from the following additional descriptions and from the drawings, wherein:

BRIEF DESCRIPTION OF THE DRAWINGS

FIG. 9 is an enlarged fragmentary schematic view, taken from a different angle, showing the fully-installed replacement creeper subassembly, including a lay-shaft assembly, a shift apparatus, and a transmission cover.

DETAILED DESCRIPTIONS OF PREFERRED EMBODIMENTS

Figure 1:
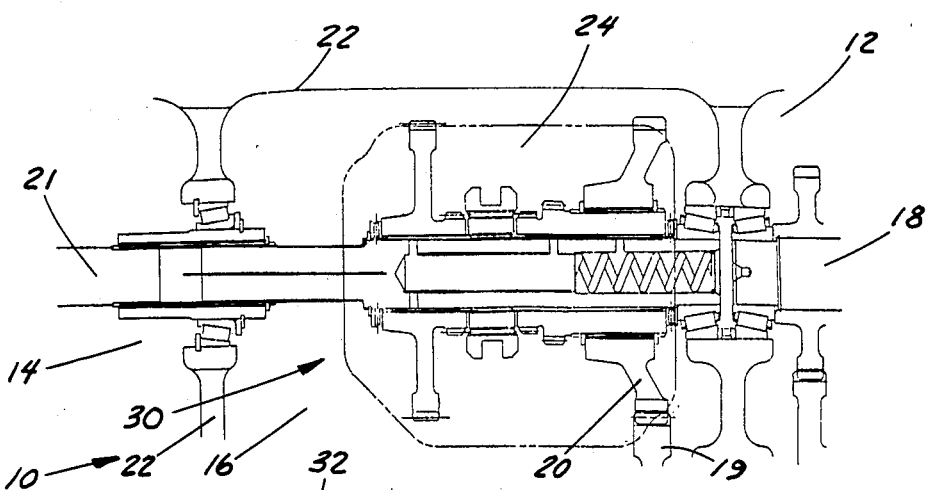
FIG. 1 is a fragmentary schematic side elevation of a transmission section showing a factory-installed creeper subassembly.
Figure 2:
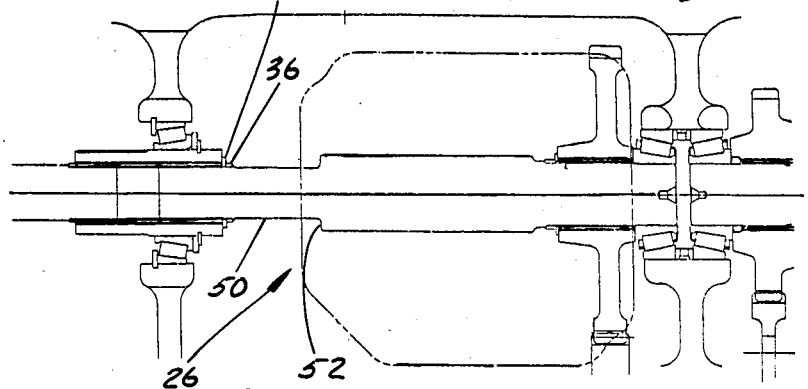
FIG. 2 is a similar side elevation showing a factory-installed noncreeper subassembly to be replaced using the method of this invention.
Figure 3:
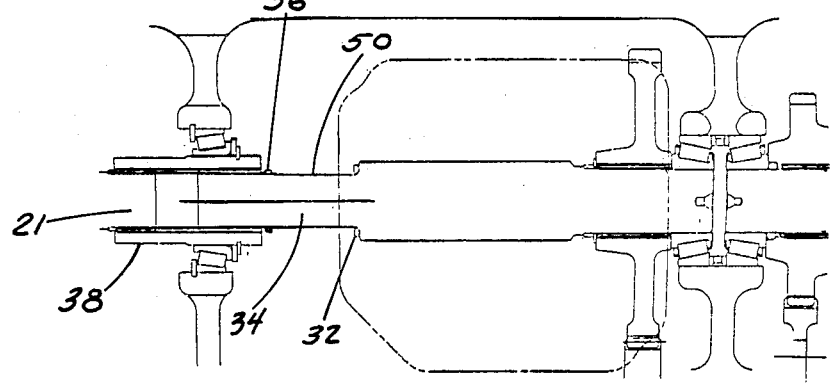
FIGS. 3-5 are similar side elevations illustrating sequential steps in the removal of the noncreeper subassembly shown in FIG. 2.

The figures illustrate a portion of a transmission 10 of a tractor or other similar device. Each of the figures shows a fragmentary portion of the speed section 12 of transmission 10, a fragmentary portion of the range section of transmission 10, and the option section 16 of transmission 10 which is between speed and range sections 12 and 14.

Speed section 12 includes an input shaft 18 and a drop shaft (not shown) to drive a gear 19 engaged with a transfer gear 20. Transfer gear 20 is on the subassembly which is the principal subassembly of concern in this invention.

As illustrated in FIGS. 1-8, range section 12 has a shuttle shaft 21 which is axially-aligned with the main shaft (described later) of the gear subassembly in option section 16 and is joined to it by means of a collar (described later).

Transmission 10 has a case 22 with a window 24, the position of which is illustrated by phantom lines in FIGS. 1-8. Window 24 is adjacent to the gear subassembly in option section 16 and is dimensioned to allow removal and insertion of such gear subassembly. More specifically, it is dimensioned to allow removal of a noncreeper subassembly 26 shown in FIGS. 2-5 and to replace it with a creeper subassembly 28 shown in FIGS. 6-9.

FIG. 1 illustrates a factory-installed creeper subassembly 30 which has no relationship to this invention. Creeper subassembly 30 is slightly different from the creeper subassembly 28 which is designed to replace noncreeper subassembly 26. And, the noncreeper subassembly 26 which may be replaced is designed to accommodate the replacement operations. Such differences will be made apparent by the description which follows.

FIGS. 2-9 serve to illustrate the sequence of steps followed to replace factory-installed noncreeper subassembly 26 with creeper subassembly 28. Such replacement operation may be carried out simply and with minimal tools. It is intended that such creeper installation be carried out away from the factory by a dealer.

Window 24 of transmission case 22 has a cover which is bolted onto the tranmission case. The first step in installing the creeper subassembly is to remove the window cover. At that point, factory-installed noncreeper subassembly 26 will be in the condition and position represented by FIG. 2.

A snap ring 32 on noncreeper main shaft 34 is fixed in place on such shaft by butt means 36. Butt means by itself does not interfere with movement of the collar. Snap ring 32 serves to hold noncreeper collar 38 in position on main shaft 34 such that the opposite ends of collar 38 are splined onto the opposed distal ends 40 and 42 of main shaft 34 and shuttle shaft 21, respectively. Supported on noncreeper collar 38 is a bearing cone 44 which is engaged with a bearing cup 46. Bearing cup 46 is affixed to an internal orifice 48 in transmission case 22.

The next step in installation of creeper subassembly 28 in place of factory-installed noncreeper subassembly 26 is to reach through window 24 and grasp snap ring 32 to spread it and thus release it from its engagement with main shaft 34. This may be done using a standard snap-ring spreading tool. While snap ring 32 is spread, it is moved along main shaft 34 in a direction away from shuttle shaft 21, to the position shown in FIG. 3.

Figure 4:
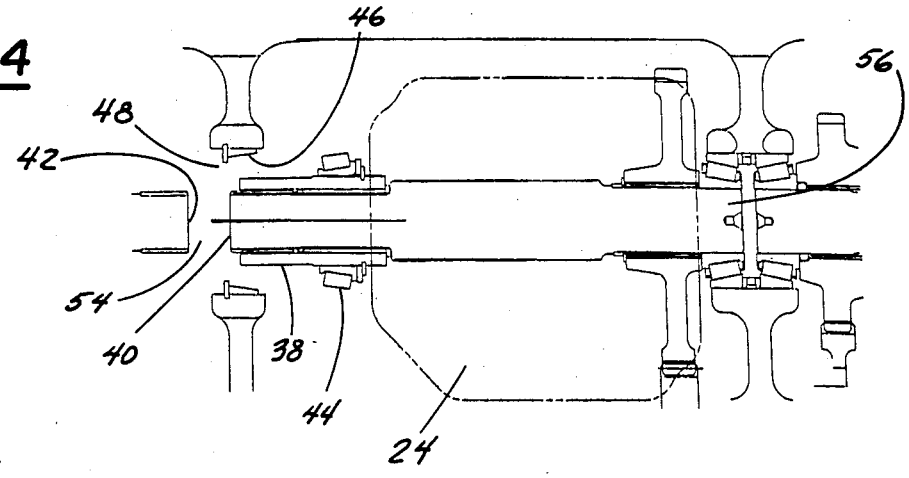

Main shaft 34 has a reduced diameter end portion 50 which is splined a considerable distance from the end of the shaft. This allows noncreeper collar 38, now that snap ring 32 has been moved away, to be moved along main shaft 34 until it and snap ring 32 (which is pushed by it) engage shoulder 52. This sliding of noncreeper collar 38 opens up the void 54 which exists between distal ends 40 and 42 of main shaft 34 and shuttle shaft 21, as illustrated in FIG. 4. The lengths of main shaft 34 and shuttle shaft 21 are limited to allow creation of such void.

Figure 5:
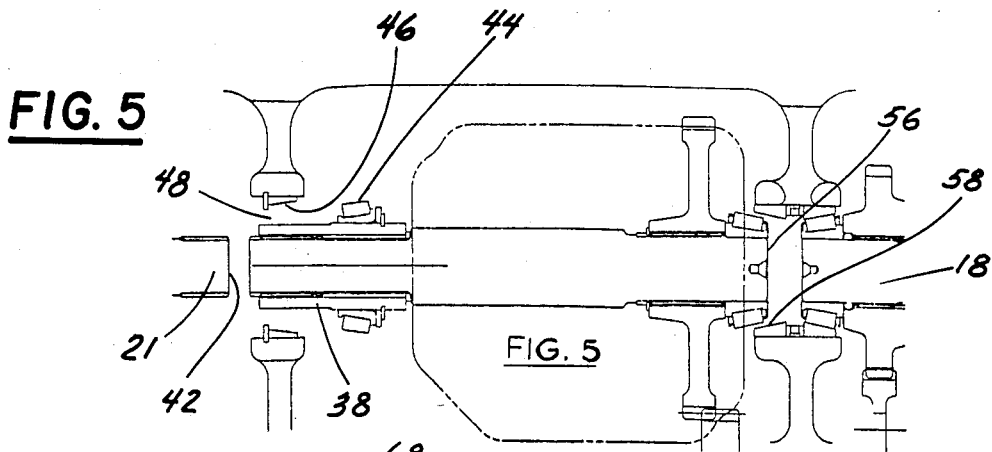

The next step is to use void 54 to move factory-installed noncreeper subassembly 26 in an axial direction toward shuttle shaft 21, thus disengaging the opposite or second end of subassembly 26 from its seat 58. This is illustrated in FIG. 5.

Thus unseated, noncreeper subassembly 26 may be tilted and manipulated through window 24 to remove it from transmission case 22. Second end 56 of noncreeper subassembly 26 may be the first portion of the subassembly coming out of window 24.

In a reverse manner, creeper subassembly 28 will be manipulated through window 24, distal end 60 normally being the first portion of the subassembly to pass through window 24. After creeper subassembly 28 is inside transmission case 22, it is brought into axial alignment with shuttle shaft 21, to the position shown in FIG. 6. This alignment is made possible by the presence of void 54, previously described. At this point, creeper collar 62 is fully inserted over distal end 60 such that void 54 may be utilized in the manner described.

Figure 7:
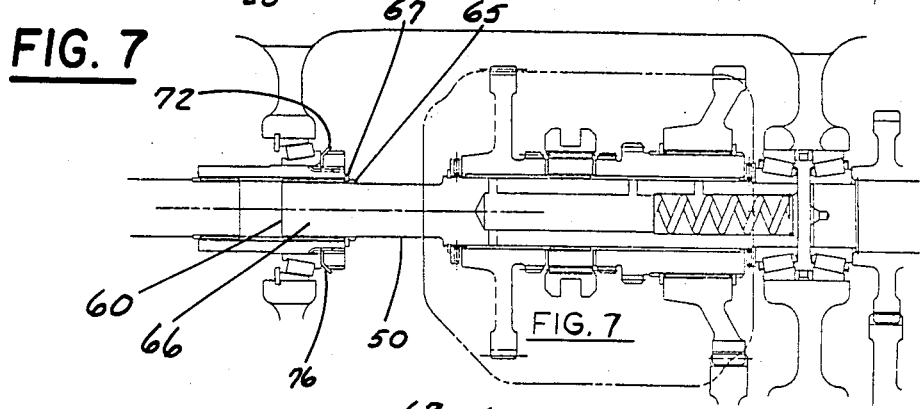
Figure 8:
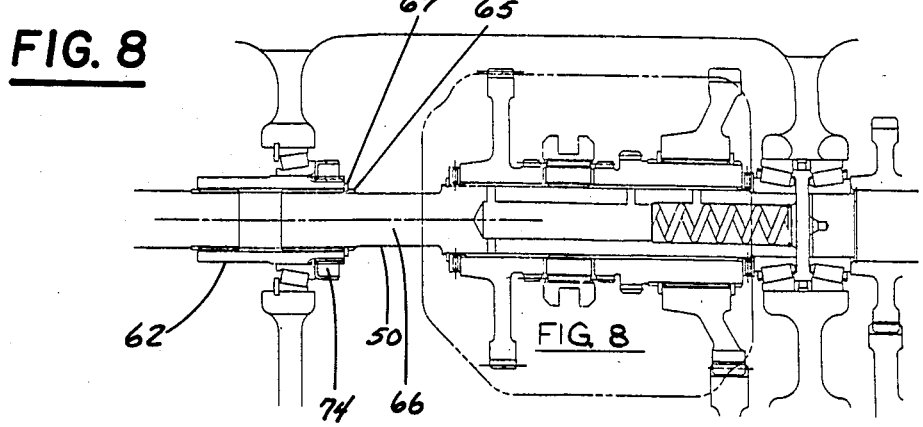

The next step is to seat creeper end 64 onto seat 58 by moving subassembly 28 to the right, as shown in FIG. 7. Then, creeper collar 62 is moved by sliding it along creeper main shaft 66 through void 54 and into splined engagement with shuttle shaft 21. Creeper main shaft 66, like noncreeper main shaft 34, is splined a sufficient distance along its length from its distal end to accommodate such positioning and movement.

Figure 6:
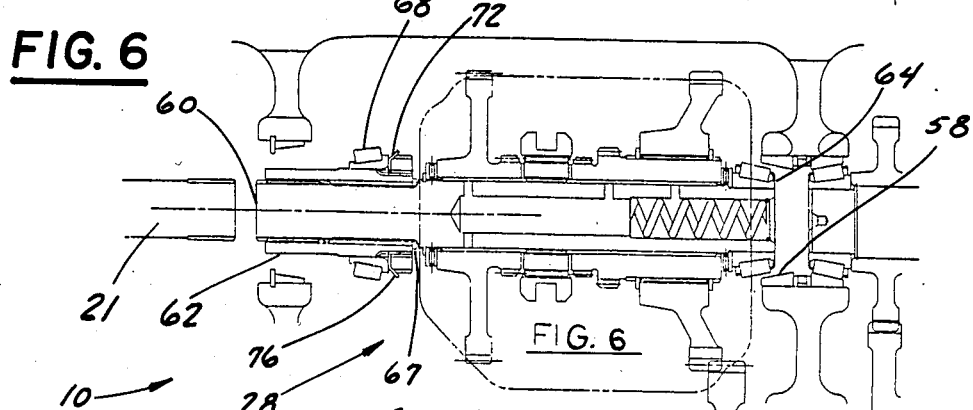
FIGS. 6-8 are similar side elevations illustrating sequential steps in placement and installation of a creeper subassembly.

When creeper collar 62 is positioned in proper engagement with shuttle shaft 21 and main shaft 66, creeper snap ring 67 is moved from the position shown in FIG. 6 to its final position as shown in FIG. 7. Snap ring 67 is held in that position by butt means 65 on main shaft 66. The result of these operations is illustrated in FIG. 7.

Before describing the remaining replacement operations, a description of creeper collar 62 and the apparatus secured thereto will be helpful. Creeper collar 62 supports a bearing cone 68 (similar to bearing cone 44) and has a nut-engaging threaded portion 70 adjacent to bearing cone 68 and extending to the end of the collar into which main shaft 66 is inserted. A lock washer 72 is placed on threaded portion 70 and is held thereon by a lock nut 74. Lock washer 72 is keyed at its inner diameter to the outside of creeper collar 62 by a common key and slot arrangement (not shown). Lock washer 72 also has a keying means 76 at its outer diameter positioned to be bent into engagement with a slot in the outer diameter of lock nut 74.

Lock nut 74 and lock washer 72 on threaded portion 70 are used in the next step in the method. Lock nut 74 is tightened to seat bearing cone 68 properly against bearing cup 46. When the proper seating is achieved, keying means 76 on lock washer 72 is bent to the position shown in FIG. 8 to engage lock nut 74, thus holding the bearing in proper position.

To assure that the bearing is in proper position and condition for use, lock nut 74 may be backed off just a bit, perhaps one quarter of a turn, prior to setting it in place by placement of keying means 76. A blow to the bearing cone 44 through exposed creeper collar 62 or lock nut 74 may be used to condition the bearing for use.

The next step is installation of a lay-shaft assembly 78 and shift apparatus 80, shown in FIG. 9. Lay-shaft assembly and shift apparatus 80 are supported by a window cover 82. When lay-shaft assembly 78 and shift apparatus 80 are in place, window cover 82 is secured to transmission case 22, such as by bolting, thus closing window 24.

The parts of this inventive apparatus may be made using materials and methods well known to those skilled in the art.

While the principles of this invention have been described in connection with specific embodiments, it should be understood clearly that these descriptions are made only by way of example and are not intended to limit the scope of the invention.

What is claimed:

1. A method for replacing a noncreeper subassembly with a creeper subassembly in a transmission with a window adjacent to the noncreeper subassembly, each such subassembly having a first end and an opposite second end and being joined at its first end by its main shaft to a transmission shuttle shaft by splining of opposed distal ends of such shafts, which are axially spaced to form a void therebetween, in opposite ends of a collar journaled in a bearing cup on a transmission case orifice, each subassembly having stop means on its main shaft limiting shaft insertion in the collar, comprising:

opening the window:

reaching through the window and unseating the noncreeper collar from the bearing cup such that said collar no longer joins the main shaft to the shuttle shaft;

moving the noncreeper subassembly in the void toward the shuttle shaft to unseat the noncreeper second end, and from that position manipulating the noncreeper subassembly out of the case through the window;

inserting a creeper subassembly through the window and into the case, said creeper main shaft having a creeper collar thereon and means to secure the creeper collar in position;

aligning the creeper subassembly;

securing the creeper collar into engagement with the shuttle shaft by positioning of said stop means; and closing the window by securing to the case a window cover which supports a layshaft assembly and shift apparatus for engagement with the creeper subassembly.

2. The method of claim 1 wherein the unseating and removing steps comprise:

moving the stop means on the noncreeper main shaft away from the distal end thereof; and sliding the noncreeper collar further onto the noncreeper main shaft to remove it from the shuttle shaft and open the void between the distal ends.

3. The method of claim 2 wherein the noncreeper stop means is a snap ring held in fixed axial position against a butt means on the noncreeper main shaft, and wherein the moving step comprises spreading the snap ring to disengage it from the butt means and sliding it along the noncreeper main shaft in a direction away from the shuttle shaft.

4. The method of claim 2 wherein the creeper collar has a bearing cone supported thereon and an axially-adjustable means thereon adjacent to the cone and wherein the aligning and securing steps comprise:

inserting the distal end of the creeper main shaft into the void and, with it located in that position, axially aligning the creeper main shaft with the shuttle shaft;

seating the end of the creeper subassembly by moving the creeper main shaft axially away from the shuttle shaft;

sliding the creeper collar along the creeper main shaft, through the void and into engagement with the shuttle shaft;

moving the creeper stop means toward the distal end of the creeper main shaft into a position holding the creeper collar in its engagement with the shuttle shaft; and moving the axially-adjustable means along the creeper collar to seat the bearing cone on the bearing cup and then locking the axially-adjustable means in position on the creeper collar.

5. The method of claim 4 wherein the creeper collar has a nut-engaging threaded portion adjacent to the cone and wherein the axially-adjustable means comprises a lock nut and lock washer on the threaded portion, said lock washer being keyed to the creeper collar and having means to key it to the nut, and wherein the locking step comprises keying the lock washer to the lock nut.

6. The method of claim 4 wherein each of the stop means is a snap ring engageable on its respective main shaft in fixed axial position against a butt means and the moving steps comprise spreading the snap ring and sliding it along its main shaft.

* * * * *